United States Patent
Condo et al.

(10) Patent No.: US 9,783,681 B2
(45) Date of Patent: *Oct. 10, 2017

(54) SOLVENTLESS FUNCTIONALIZATION, MILLING, AND COMPOUNDING PROCESS WITH REACTIVE DILUENTS

(75) Inventors: Peter D. Condo, Lake Elmo, MN (US); Jung-Sheng Wu, Woodbury, MN (US); Chad A. Haraldson, Apple Valley, MN (US); William J. Schultz, North Oaks, MN (US); Emily S. Goenner, Shoreview, MN (US); James E. Thorson, Hudson, WI (US); Wendy L. Thompson, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 292 days.

This patent is subject to a terminal disclaimer.

(21) Appl. No.: 13/500,836

(22) PCT Filed: Oct. 21, 2010

(86) PCT No.: PCT/US2010/053460
§ 371 (c)(1),
(2), (4) Date: Apr. 6, 2012

(87) PCT Pub. No.: WO2014/050121
PCT Pub. Date: Apr. 28, 2011

(65) Prior Publication Data
US 2012/0214948 A1    Aug. 23, 2012

Related U.S. Application Data

(60) Provisional application No. 61/253,714, filed on Oct. 21, 2009.

(51) Int. Cl.
C09C 1/02 (2006.01)
C09C 3/04 (2006.01)
(Continued)

(52) U.S. Cl.
CPC .............. *C09C 1/021* (2013.01); *B82Y 30/00* (2013.01); *C08J 3/203* (2013.01);
(Continued)

(58) Field of Classification Search
CPC ........ C08G 59/00; C08G 59/02; B82Y 30/00; B82Y 40/00; B01F 3/18; B01F 3/12; B82B 3/00
(Continued)

(56) References Cited

U.S. PATENT DOCUMENTS 4,447,564 A   5/1984   Grimmer
4,478,963 A   10/1984  McGarry
(Continued)

FOREIGN PATENT DOCUMENTS

AT   WO 2005071003 A1 *   8/2005   .............. C09C 1/021
EP   1 426 390             6/2004
(Continued)

OTHER PUBLICATIONS

STN CAS Registry No. 471-34-1 (1984).*
(Continued)

*Primary Examiner* — Randy Gulakowski
*Assistant Examiner* — Ha S Nguyen
(74) *Attorney, Agent, or Firm* — Philip P. Soo; Thomas M. Spielbauer (57) ABSTRACT

Methods of compounding nanoparticles with a resin, e.g., a curable resin and one or more surface modifying agents are described. The methods use wet milling technology, including both continuous and batch milling processes, and can be used to functionalize the nanoparticles and disperse the functionalized nanoparticles into the resin system in a single process. Methods of compounding curable resin systems containing reactive diluents are also disclosed.

18 Claims, 1 Drawing Sheet

(51) Int. Cl.

| | | |
|---|---|---|
| C09C 3/08 | (2006.01) | |
| C08J 3/20 | (2006.01) | |
| C08K 3/26 | (2006.01) | |
| C08K 5/42 | (2006.01) | |
| C08K 5/51 | (2006.01) | |
| C08K 5/521 | (2006.01) | |
| C08K 5/5317 | (2006.01) | |
| B82Y 30/00 | (2011.01) | |
| C01F 11/18 | (2006.01) | |

(52) U.S. Cl.
CPC ...... C01P 2004/62 (2013.01); C01P 2004/64 (2013.01); C08J 2367/06 (2013.01)

(58) Field of Classification Search
USPC .......................... 428/323; 524/425; 525/242
See application file for complete search history.

(56) References Cited

U.S. PATENT DOCUMENTS

| | | | |
|---|---|---|---|
| 4,624,971 A | 11/1986 | van Tao et al. | |
| 5,084,525 A * | 1/1992 | Akutagawa ......... | C08G 59/226 523/428 |
| 5,439,746 A * | 8/1995 | Suzuki .................. | C08L 63/00 428/413 |
| 5,648,407 A * | 7/1997 | Goetz et al. ........... | 523/213 |
| 5,650,477 A * | 7/1997 | Parodi et al. .......... | 528/93 |
| 5,694,701 A | 12/1997 | Huelsmann et al. | |
| 5,980,697 A | 11/1999 | Kolb et al. | |
| 6,342,100 B1 | 1/2002 | Nover | |
| 7,596,986 B2 | 10/2009 | Daniels et al. | |
| 7,709,090 B2 * | 5/2010 | Nover ................... | C09C 1/021 423/274 |
| 2001/0040007 A1 | 11/2001 | Hartman et al. | |
| 2002/0156152 A1 | 10/2002 | Zhang et al. | |
| 2003/0032693 A1 | 2/2003 | Angeletakis et al. | |
| 2003/0055207 A1 | 3/2003 | Xu et al. | |
| 2004/0076574 A1 | 4/2004 | Xu et al. | |
| 2004/0092639 A1 | 5/2004 | Kasahara et al. | |
| 2007/0199477 A1 | 8/2007 | Hill et al. | |
| 2007/0240619 A1 | 10/2007 | Munchow | |
| 2008/0075963 A1 | 3/2008 | Dershem | |
| 2008/0227901 A1 | 9/2008 | Lefevre et al. | |
| 2009/0017304 A1 * | 1/2009 | Koller et al. ................. | 428/407 |
| 2009/0137706 A1 | 5/2009 | Healy et al. | |
| 2010/0273920 A1 * | 10/2010 | Bernard ............. | C08G 18/5024 524/114 |
| 2011/0079668 A1 | 4/2011 | Nelson et al. | |

FOREIGN PATENT DOCUMENTS

| | | | |
|---|---|---|---|
| EP | 2 036 944 | 3/2009 | |
| FR | 2923834 A1 * | 5/2009 | ......... C08G 18/5024 |
| JP | 2002003726 A * | 1/2002 | |
| JP | 2006 188552 | 7/2006 | |
| JP | 2006188552 A * | 7/2006 | |
| JP | 2008101051 A * | 5/2008 | |
| WO | WO 9837122 A1 * | 8/1998 | |
| WO | WO 00/49081 | 8/2000 | |
| WO | WO 03/057740 | 7/2003 | |
| WO | WO 2010/080459 | 4/2004 | |
| WO | WO 2007/014878 | 2/2007 | |
| WO | WO 2007/108217 | 9/2007 | |
| WO | WO 2007108217 A1 * | 9/2007 | |
| WO | WO 2008/027979 | 3/2008 | |
| WO | WO 2009/152296 | 12/2009 | |
| WO | WO 2011/050121 | 4/2011 | |

OTHER PUBLICATIONS

PCT International Search Report from Application No. PCT/US2010/053460 dated Jun. 30, 2011, 4 pages.

Avella et al., "Novel PMMA/CaCO$_3$ Nanocomposites Abrasion Resistant Prepared by an in Situ Polymerization Process," *Nano Letters*, vol. 1, No. 4, pp. 213-217, (2001).

ASTM Designation: D 5045-99, "Standard Test Methods for Plane-Strain Fracture Toughness and Strain Energy Release Rate of Plastic Materials," (2007) 9 pages.

ASTM Designation: D 2583-07, "Standard Test Method for Indentation Hardness of Rigid Plastics by Means of a Barcol Impressor," (2001) 4 pages.

Handbook of Thermoset Plastics, Second Edition, Sidney H. Goodman, Ed. (1998) p. 122.

Jin et al., "Interfacial toughness properties of trifunctional epoxy resins/calcium carbonate nanocomposites," *Materials Science and Engineering A*, 475, pp. 190-193, (2008).

Kresse et al., "*Ab initio* molecular-dynamics simulation of the liquid metal-amorphous-semiconductor transition in germanium," *Physical Review B*, vol. 49, No. 20, pp. 14251-14271, (May 15, 1994).

Kresse et al., "*Ab initio* molecular-dynamics for liquid metals," *Physical Review B*, vol. 47, No. 1, pp. 558-561, (Jan. 1,1993).

Kresse et al., "Efficiency of ab-initio total energy calculations for metals and semiconductors using a plante-wave basis set," *Computational Materials Science* 6, pp. 15-50, (1996).

Kresse et al., "Efficient iterative schemes for *ab initio* total-energy calculations using a plane-wave basis set" *Physical Review B*, vol. 54, No. 16, pp. 11169-11186, (Oct. 15, 1996).

Lu et al., Polymer/calcium carbonate nanocomposites, *Polymer Nanocomposites*, CRC Press, pp. 412-439, (2006).

Melo et al., "High Energy Mill Processing of Polymer Based Nanocomposites", Journal of Composite Materials, 2363, (2008).

Perdew et al., "Generalized Gradient Approximation Made Simple," *Physical Review Letters*, vol. 77, No. 18, pp. 3865-3868, (Oct. 28, 1996).

Van Krevelen, *Properties of Polymers: Their Correlation with Chemical Structure; Their Numerical Estimation and Prediction from Additive Group Contributions*, third edition, Elsevier Science Publishers B.V., Chapter 7, "Cohesive Properties and Solubility," pp. 189-225, (1990).

Wang et al., "Nano-CaCO$_3$/polypropylene composites made with ultra-high-speed mixer," *Journal of Materials Science Letters 21*, pp. 985-986, (2002).

Yu et al., "Novel Uncured Epoxy Resin/CaCO$_3$ Nanocomposites," *Polymer-Plastics Technology and Engineering*, 45: pp. 809-813, (2006).

Yu et al., "Preparation of Exoxy Resin CaCo$_3$ Nancomposites and Performance of Resultant Powder Coatings," *Journal of Applied Polymer Science*, vol. 101, pp. 2656-2660, (2006).

Yu et al., "Study on nano-CaCO$_3$ modified epoxy powder coatings," *Progress in Organic Coatings*, 55, pp. 296-300, (2006).

Zhang et al., "Preparation and characterization of polystyrene/butyl acrylate/ nano-CaCO$_3$ composites," *Journal of Beijing University Chemical Technology*, 32, pp. 1-4, (2005), English Abstract.

* cited by examiner

# US 9,783,681 B2

SOLVENTLESS FUNCTIONALIZATION, MILLING, AND COMPOUNDING PROCESS WITH REACTIVE DILUENTS

CROSS REFERENCE TO RELATED APPLICATIONS

This application is a national stage filing under 35 U.S.C. 371 of PCT/US2010/053460, filed Oct. 21, 2010, which claims priority to U.S. Provisional Application No. 61/253,714, filed Oct. 21, 2009, the disclosures of which are incorporated by reference in their entirety herein.

FIELD

The present disclosure relates to methods of compounding nanoparticles with a resin, e.g., a curable resin and one or more surface modifying agents. The methods use milling technology, in some embodiments, continuous milling technology, and can be used to functionalize the nanoparticles and disperse the functionalized nanoparticles into the resin system in a single process. For example, in some embodiments, methods according to the present disclosure can be used to compound nanoparticles into resin compositions comprising reactive monomer species, even in the presence of low boiling, volatile co-monomers. In some embodiments, the nanoparticle-containing resin systems produced by some methods of the present disclosure have low viscosities, show little or no signs of monomer advancement or loss of volatile components, and cure to provide composites containing well-dispersed, surface-modified nanoparticles.

SUMMARY

Briefly, in one aspect, the present disclosure provides a method of preparing a composition. The method comprises combining nanoparticles, a surface modifying agent, a curable resin and a reactive diluent to form a mixture. The method further comprises milling the mixture in a first wet milling apparatus comprising milling beads to form a first milled resin system. In some embodiments, the first wet milling apparatus is a continuous wet milling apparatus. In some embodiments, the first milled mixture comprises surface-modified nanoparticles dispersed in the curable resin and reactive diluent, wherein the surface-modified nanoparticles comprise the nanoparticles modified with the surface modifying agent.

In some embodiments, the curable resin comprises at least one of a vinyl ester and an epoxy. In some embodiments, the reactive diluent comprises styrene.

In some embodiments, the nanoparticles comprise calcite nanoparticles. In some embodiments, the surface modifying agent is a zwitterion. In some embodiments, the surface modifying agent is selected from the group consisting of sulfonic acid ligand and a phosphonic acid ligand. In some embodiments, the surface modifying agent comprises polyetheramine sulfonic acid. In some embodiments, the surface modifying agent comprises at least one of polyethylene glycol phosphonic acid and acrylic phosphonic acid.

In some embodiments, the mixture comprises less than 2 wt. % solvent, e.g., less than 0.5 wt. % solvent.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

As used herein, "agglomerated" is descriptive of a weak association of primary particles usually held together by charge or polarity. Agglomerated particles can typically be broken down into smaller entities by, for example, shearing forces encountered during dispersion of the agglomerated particles in a liquid.

In general, "aggregated" and "aggregates" are descriptive of a strong association of primary particles often bound together by, for example, residual chemical treatment, covalent chemical bonds, or ionic chemical bonds. Further breakdown of the aggregates into smaller entities is very difficult to achieve. Typically, aggregated particles are not broken down into smaller entities by, for example, shearing forces encountered during dispersion of the aggregated particles in a liquid.

Generally, curable resin systems are used in a wide variety of applications, e.g., as a protective layer (e.g., gel coats) and as the impregnation resin in composites (e.g., fibrous composites). Resin systems are often selected based on the desired mechanical properties of the final product including, e.g., hardness, toughness, fracture resistance, and the like. In some applications, the optical appearance of the finished product may be important such that properties like clarity and haze must be considered. In addition, process conditions may lead to preferred ranges for properties such as viscosity. Finally, the desired end use of the product often leads to additional requirements, e.g., erosion resistance or anti-blistering.

Generally, a curable resin system comprises a curable (i.e., crosslinkable) resin and a reactive diluent. Generally, any known curable resin may be used in the various embodiments of the present disclosure. In some embodiments, the curable resin may be an ethylenically-unsaturated curable resin. For example, in some embodiments, an unsaturated polyester resin may be used. In some embodiments, the unsaturated polyester resin is the condensation product of one or more carboxylic acids or derivatives thereof (e.g., anhydrides and esters) with one or more alcohols (e.g., polyhydric alcohols).

In other embodiments, vinyl ester resins are used. As used herein, the term "vinyl ester" refers to the reaction product of epoxy resins with ethylenically-unsaturated monocarboxylic acids. Exemplary epoxy resins include bisphenol A diglycidyl ether (e.g., EPON 828, available from Miller-Stephenson Products, Danbury, Conn.). Exemplary monocarboxylic acids include acrylic acid and methacrylic acid. Although such reaction products are acrylic or methacrylic esters, the term "vinyl ester" is used consistently in the gel coat industry. (See, e.g., Handbook of Thermoset Plastics (Second Edition), William Andrew Publishing, page 122 (1998).)

In still other embodiments, (meth)acrylate resins, including, e.g., urethane (meth)acrylates, polyethyleneglycol (multi)(meth)acrylates, and epoxy (multi)(meth)acrylates may be used. In other embodiments, direct milling into epoxy resins may be achieved.

Generally, the curable resin is both soluble in, and reacts with the reactive diluent to form a copolymerized network. Depending on the curable resin, exemplary reactive diluents include styrene, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate, and other mono- and multi-functional (meth)acrylates. Reactive diluents used with epoxy resins also include mono- and multi-functional glycidyl ethers such as polypropylene glycol diclycidyl ether, 2-ethylhexyl glycidyl ether, allyl glycidyl ether, n-butyl glycidyl ether, 1,4-butanediol diglycidyl ether, 1,4-cyclohexanediol diglycidyl ether, hexanedioldiglycidyl ether, and 3,4-epoxycyclohexylmethyl 3,4-epoxycyclohexane carboxylate.

Generally, "surface modified nanoparticles" comprise surface treatment agents attached to the surface of a core. In some embodiments, the core comprises a metal oxide. Any known metal oxide may be used. Exemplary metal oxides include silica, titania, alumina, zirconia, vanadia, chromia, antimony oxide, tin oxide, zinc oxide, ceria, and mixtures thereof. In some embodiments, the core comprises a nonmetal oxide, e.g., carbonates, such as, alkaline earth metal carbonates (e.g., calcium carbonate). Exemplary forms of calcium carbonate include natural ground calcium carbonate, natural and/or synthetic precipitated calcium carbonates (e.g., those having vateritic, calcitic, or aragontic crystalline structures). In some embodiments, calcite nanoparticles may be used. In some embodiments mixed carbonates such as dolomite. In some embodiments, calcite nanoparticles may be used.

As used herein, the term "calcite nanoparticle" refers to a nanoparticle having a calcite surface. This includes nanoparticles that are substantially, entirely calcite, as well nanoparticles comprising other inorganic (e.g., metal oxide or non-metal oxide cores) or organic cores having a calcite surface. Calcite is the crystalline form of calcium carbonate and typically forms rhombohedral crystals.

Generally, a surface treatment agent is an organic species having a first functional group capable of attaching (e.g., chemically (e.g., covalently or ionically) attaching, or physically (e.g., strong physisorptively) attaching) to the surface of a nanoparticle. The attached surface treatment agent alters one or more properties of the nanoparticle. In some embodiments, the surface treatment agents have a low molecular weight, e.g. a weight average molecular weight less than 1000.

Surface-modifying agents for calcite nanoparticles generally include at least a binding group and a compatibilizing segment:

Comp. Seg.-Binding Group;

wherein "Com. Seg." refers to the compatibilizing segment of the surface-modifying agent The compatibilizing segment is selected to improve the compatibility of the calcite nanoparticles with one or more components of the resin system. Generally, the selection of the compatibilizing group depends on a number of factors including the nature of the curable resin and the reactive diluent, the concentration of the nanoparticles, and the desired degree of compatibility.

In some embodiments, the compatibilizing segment may be selected to provide a positive enthalpy of mixing for the composition containing the surface-modified nanoparticles and the curable resin. If the enthalpy of mixing is positive, the dispersion of nanoparticles in the resin is typically stable. To ensure a positive enthalpy of mixing, the solubility parameter of the compatibilizing segment can be matched to the solubility parameter of the curable resin. In some embodiments, the materials can be selected such that the difference in these solubility parameters is no more than 4 $J^{1/2}$ cm$^{-3/2}$ and, in some embodiments, no more than 2 $J^{1/2}$ cm$^{-3/2}$ as determined according to *Properties of Polymers; Their Correlation with Chemical Structure; Their Numerical Estimation and Prediction from Additive Group Contributions*, third edition, edited by D. W. Van Krevelen, Elsevier Science Publishers B.V., Chapter 7, 189-225 (1990).

There are several methods known to determine the solubility parameter of a material such as a compatibilizing segment or a resin. For example, the solubility parameter of the material can be determined from measurements of the extent of equilibrium swelling of the material in a range of solvents of differing solubility parameters. The solubility parameters of the solvents themselves can be determined from their heats of evaporation. The solubility parameter delta ($\delta$) is related to the cohesive energy $E_{coh}$ and the specific volume V by the relationship $\delta=(E_{coh}/V)^{1/2}$. For solvents of low molecular weight, the cohesive energy is closely related to the molar heat of evaporation $\Delta H_{vap}$ according to $E_{coh}=\Delta H_{vap}-p\Delta V=\Delta H_{vap}-RT$. Thus, $E_{coh}$ and $\delta$ can be calculated from the heat of evaporation of the solvent or from the course of the vapor pressure as a function of temperature. To determine the solubility parameter of the material, a plot of equilibrium swelling of the material versus the solubility parameter of the solvents is generated. The solubility parameter of the material is defined as the point on this plot where maximum swelling is obtained. Swelling will be less for solvents having solubility parameters that are less than or greater than that of the material. Alternatively, there are several known methods for theoretically estimating the solubility parameter of a material based on the additive contributions of functional groups.

The binding group bonds to the calcite, connecting the surface-modifying agent to the calcite core. Unlike many silica-based nanoparticle systems wherein the surface-modifying agents are covalently bonded to the silica, the surface-modifying agents are ionically bonded to (e.g., associated with) the calcite.

In order to retain the surface-modifying agents with the calcite cores during processing of the compositions, it may be desirable to select binding groups having high bond energies to calcite. Bond energies can be predicted using density functional theory calculations. In some embodiments, the calculated bond energies may be at least 0.6, e.g., at least 0.7 electron volts. Generally, the greater the bond energy the greater the likelihood that the binding group will remain ionically associated with the particle surface. In some embodiments, bond energies of at least 0.8, e.g., at least 0.9, or even at least 0.95 electron volts, may be useful.

In some embodiments, the binding group comprises a phosphonic acid, e.g., surface-functionalizing agents having a formula:

In some embodiments, the binding group comprises a sulfonic acid, e.g., surface-functionalizing agents having a formula:

In some embodiments, the surface-modifying agent also comprises a reactive group, i.e., a group capable of reacting with the curable resin, e.g., during the curing process. This can result in the nanocalcite particle being strongly bonded into the resin matrix and may lead to an improvement in the physical properties of the resulting cured nanocomposite. Generally, the reactive group is selected based on the nature of the curable resin. In some embodiments, the reactive group may be located on the end of the compatibilizing segment:

Rx. Group-Comp. Seg.-Binding Group;

wherein "Rx. Group" is the reactive group. In some embodiments, the reactive group may be located along the backbone of or pendant to the backbone of the compatibilizing segment. In some embodiments, the reactive group may be located between the compatibilizing segment and the binding group:

Comp. Seg.-Rx. Group-Binding Group.

In some embodiments, a linking group is present connecting the compatibilizing segment with the binding group:

Comp. Seg.-Linking Group-Binding Group.

For example, in some embodiments, the surface-modifying agent comprises a polyetheramine. Exemplary polyetheramines include those available under the trade name JEFFAMINE® available from Huntsman Corporation, The Woodlands, Tex. The polyether serves as a compatibilizing segment, while the amine is the linking group linking the compatibilizing segment with the binding group.

In some embodiments, the surface-modifying agent comprises a zwitterion, i.e., a compound carrying a net charge of zero, but which is capable of carrying a formal positive and negative charge on different atoms. In some embodiments, the formal negative charge is carried by the binding group. In some embodiments, the formal positive charge is carried on the nitrogen atom of an amine, e.g., an amine linking group. In such embodiments, the amine may serve as both the linking group and the reactive group.

In some embodiments, the surface treatment agent further includes one or more additional functional groups providing one or more additional desired properties. For example, in some embodiments, an additional functional group may be selected to provide a desired degree of compatibility between the surface modified nanoparticles and one or more of the additional constituents of the resin system, e.g., one or more of the curable resins and/or reactive diluents. In some embodiments, an additional functional group may be selected to modify the rheology of the resin system, e.g., to increase or decrease the viscosity, or to provide non-Newtonian rheological behavior, e.g., thixotropy (shear-thinning).

In some embodiments, the surface-modified nanoparticles are reactive; therefore, at least one of the surface treatment agents used to surface modify the nanoparticles of the present disclosure includes a second functional group capable of reacting with one or more of the curable resin(s) and/or one or more of the reactive diluent(s) of the resin system.

Particle size measurements can be based on, e.g., transmission electron microscopy (TEM). In some embodiments, the surface-modified nanoparticles have a primary particle size of between about 5 nanometers to about 500 nanometers, and in some embodiments from about 5 nanometers to about 250 nanometers, and even in some embodiments from about 50 nanometers to about 200 nanometers. In some embodiments, the cores have an average diameter of at least about 5 nanometers, in some embodiments, at least about 10 nanometers, at least about 25 nanometers, at least about 50 nanometers, and in some embodiments, at least about 75 nanometers. In some embodiments the cores have an average diameter of no greater than about 500 nanometers, no greater than about 250 nanometers, and in some embodiments no greater than about 150 nanometers.

In some embodiments, the nanoparticles can have a particle size of ranging from about 5 to about 150 nm. Commercially available calcite nanoparticles include those available from NanoMaterials Technology LTD, Singapore (e.g., NPCC-111 and NPC-201) and those available from Solvay Specialty Chemicals, LTD. (e.g., SOCAL 31).

Traditionally, nanoparticles have been compounded into resins using a combination of solvent exchange and solvent stripping processes. In addition to being time-consuming and requiring the use of multiple solvents, such processes often expose the curable resins to high temperatures. Such high temperatures can lead to oligomerization and other undesirable reactions during the compounding process with a resultant increase in viscosity, particularly in the case of vinyl ester and unsaturated polyester resins. In addition, low-boiling-temperature components (e.g., volatile reactive diluents) may be lost during these compounding steps.

The present inventors have discovered alternative procedures for combining nanoparticles and surface treatment agents into a resin system comprising a reactive diluent. These procedures do not require the use of solvents, and are compatible with low boiling point resins. In addition, such methods may be used to functionalize the nanoparticles and disperse the functionalized nanoparticles in the curable resin system in a single process without causing premature cure.

In some embodiments, the processes of the present disclosure incorporate several processes in a single, solventless, milling process. These processes are comminution (i.e., particle size reduction); surface functionalization of the particles; and compounding of the surface-modified particles into a resin system.

Figure 1:
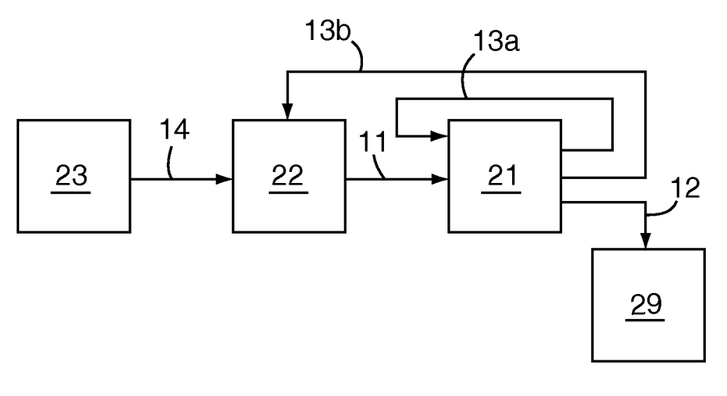
FIG. 1 is a schematic diagram of an exemplary solventless milling process according to some embodiments of the present disclosure.

An exemplary compounding process according to some embodiments of the present disclosure is shown in FIG. 1. As shown by arrow 11, a mixture of unmodified nanoparticles, a surface modifying agent, and a curable resin system comprising a reactive diluent are fed into continuous, wet milling apparatus 21. As shown by arrow 12, the milled output of the continuous, wet milling apparatus 21 may be collected in container 29, or, as shown by arrows 13a and 13b, some or all of the milled output may be fed back to receive further milling. Following arrow 13a, some or all of the milled output may be fed back to the entrance of continuous, wet milling apparatus 21. Also, following arrow 13b, some or all of the milled output may be discharged in a vessel or process upstream of the continuous, wet milling apparatus 21, e.g., into optional heated holding tank 22. In some embodiments, the milled output may be combined with additional amounts of curable resin, reactive diluent, nanoparticle, and/or surface modifying agent prior to a subsequent milling operation.

In some embodiments, the curable resin, the reactive diluent, unmodified nanoparticles, the surface modifying agent, and optionally other additives, are premixed using, e.g., high-speed mixer 23 to obtain a coarse dispersion. Following arrow 14, in some embodiments, this coarse dispersion may be fed into a holding tank, e.g., heated holding tank 22. In some embodiments, the coarse dispersion may be fed directly into the continuous wet milling apparatus 21.

Generally, the milling apparatus is a wet media milling apparatus. In some embodiments, the milling apparatus comprises milling beads, e.g., ceramic milling beads or stainless steel milling beads. Although the milling apparatus used is a wet media mill, no solvents or additional liquids need to be added, as the curable resin components themselves provide sufficient lubrication. Thus, despite the use of a wet milling process, methods of the present disclosure can provide substantially solvent-free compounding of nanoparticles in a resin. In some embodiments, the compositions entering the milling apparatus contain no greater than 2% by weight residual solvent. In some embodiments, the compositions entering the milling apparatus contain no greater than 1%, e.g., no greater than 0.5%, or even no greater than 0.2% by weight residual solvent.

In some embodiments, the wet milling apparatus is a wet media milling apparatus. Examples of wet media milling equipment include horizontal mills and vertical mills, e.g. NETZSCH horizontal disk mills, NETZSCH horizontal pin mills, and the like. In some embodiments, a batch wet media milling apparatus may be used. Examples of batch wet milling equipment include basket mills, e.g., HOCK-MEYER Immersion Mills.

Generally, the compositions of the present disclosure comprise at least 10 wt. %, in some embodiments, at least 20 wt. %, e.g., at least 30 wt. %, at least 40 wt. %, or even at least 50 wt. % of the surface modified nanoparticles based on the total weight of the nanoparticles and the curable resin. In some embodiments, it may be useful to have a low viscosity composition, e.g., when the composition is to be sprayed (e.g., when applying a coating), or must flow through fibers (e.g., when making fibrous composites).

Viscosity can be reduced by diluting the composition in solvents, e.g., water, organic solvents, or a combination thereof. If solvents are used, the solvent or combination of solvents can be readily selected such that the resins are soluble. While useful in some applications, the inclusion of solvents tends to increase costs, handling requirements, and process steps. In some embodiments, the compositions of the present disclosure comprise no greater than 5 wt. %, e.g., no greater than 2 wt. %, solvent, e.g., less than 1% or even less than 0.5% by weight, including 0% by weight of solvent.

In some embodiments, the compositions of the present disclosure may include additional additives such as curing agents, cure accelerators, catalysts, crosslinking agents, dyes, pigments, flame retardants, impact modifiers, mold release agents, and flow control agents. In some embodiments, the compositions may include tougheners, e.g., rubber tougheners. Exemplary rubber tougheners include coreshell rubbers. In some embodiments, nano-sized coreshell rubber tougheners may be used, i.e., coreshell rubber tougheners having an average size of less than 1 micron. In some embodiments, the nano-sized coreshell rubber tougheners have an average size of less than 500 nm, less than 250 nm, or even less than 100 nm. In some embodiments, micron-sized coreshell rubber tougheners may be used, i.e., coreshell rubber tougheners having an average size of greater than 1 micron, e.g., 1 to 10 microns.

The compositions of the present disclosure may be cured. In some embodiments, the curable resin is crosslinked. Any known crosslinking method may be used including exposure to thermal energy or actinic radiation (e.g., ultraviolet light and electron beam radiation). In some embodiments, the curable resin may also react with the surface-modifying agent. For example, in some embodiments, a reactive group of the surface-modifying agent may react with, e.g., covalently bond with, the curable resin.

Various embodiments of the compositions of the present disclosure may be used in a wide variety of applications. In some embodiments, the compositions may be applied to a surface of an article. Such coating may be cured, e.g., crosslinked.

In some embodiments, the compositions of the present disclosure may be used to form fibrous composites. For example, in some embodiments, reinforcing fibers may be impregnated with the composition to form a composite article. Composites may be formed using any known means including, e.g., resin transfer molding (RTM), filament winding, tow placement, resin infusion processes, pultrusion process, or traditional prepreg processes. The resin may then be cured using any known means including exposure to thermal energy and/or actinic radiation.

Generally, any fibers suitable for use in fibrous composites may be used. Exemplary fibers include carbon fibers, glass fibers, ceramic fibers, boron fibers, silicon carbide fibers, polyimide fibers, polyamide fibers, and polyethylene fibers. Combinations of materials may also be used. Generally, the form of the fibers is not particularly limited. Exemplary fiber forms include unidirectional array of individual continuous fibers, woven fabric, knitted fabric, yarn, roving, braided constructions and non-woven mat.

Generally, the compositions of the present disclosure may used in a wide variety of applications including as coatings on, e.g., wind blades and as gel coats on, e.g., vehicles, e.g., boats; and as composites used in the manufacture of, e.g., sporting goods (e.g., rackets, fishing poles, hockey sticks, baseball bats, sailing masts, and the like); wind blades, vehicles and vehicle parts including automobiles, ships, aircraft, and satellites, and space vehicles.

EXAMPLES

The materials used in the following examples are described in Table 1.

| Material | Description | Source |
| --- | --- | --- |
| SOCAL 31 | nanocalcite | Solvay Specialty Chemicals, LTD. |
| VE-1398-5 | HETRON 1398-5 vinyl ester resin | Ashland Chemicals |
| Ligand A | polyetheramine sulfonic acid ligand | Preparation described herein |
| Ligand B | polyethylene glycol phosphonate ligand | Preparation described herein |
| Ligand C | acrylic phosphonate ligand | Preparation described herein |
| Disp-1 | dispersant of phosphoric acid polyester and phosphoric acid | DISPERBYK-111, BYK-Chemie GmbH, Wesel, Germany |
| Disp-2 | crosslinkable dispersant | SOLSPERSE X-300 Lubrizol Corporation, Wickliffe, OH |
| vinyl toluene | vinyl toluene | TCI America Portland, OR, USA |
| PEG-DGE | polypropylene glycol diglycidyl ether | Sigma Aldrich St. Louis, MO, USA |
| EHGE | 2-ethylhexyl glycidyl ether | TCI America Portland, OR, USA |

-continued

| Material | Description | Source |
| --- | --- | --- |
| ECHM-ECHC | 3,4-epoxycyclohexylmethyl 3,4-epoxycyclohexanecarboxylate | Sigma Aldrich St. Louis, MO, USA |
| AGE | allyl glycidyl ether | TCI America Portland, OR, USA |
| BGE | n-butylglycidyl ether | TCI America Portland, OR, USA |
| BDDGE | 1,4-butanediol diglycidyl ether | Sigma Aldrich St. Louis, MO, USA |
| CHDDGE | 1,4-cyclohexanediol diglycidyl ether | Hexion Specialty Chemicals Columbus, OH, USA |
| TRIGONOX 121 | peroxide curative | Akzo Nobel |
| PERKADOX 16 | peroxide curative | Akzo Nobel |

Particle Size Procedure. The particle size of the nanoparticles was measured by laser diffraction using a HORIBA LA-950. The optical model for the calculation used a refractive index of 1.6000 for calcite and 1.3591 for the solvent acetone. The second differential method was used for smoothing and was based on 150 iterations. The calcite dispersion was diluted to approximately 1% solids with acetone. The sample was then added to the measurement cell, which was filled with acetone, until the transmittance was between the recommended levels of 85% to 95%.

$K_{IC}$ Test Procedure. The fracture toughness ($K_{IC}$) was measured according to ASTM D 5045-99, except that a modified loading rate of 0.13 cm/min (0.050 in/min) was used. A compact tension geometry was used, wherein the specimens had nominal dimensions of 3.18 cm by 3.05 cm by 0.64 cm (1.25 in by 1.20 in by 0.25 in). The following parameters were employed: W=2.54 cm (1.00 in); a=1.27 cm (0.50 in); B=0.64 cm (0.25 in). Measurements were made on between 6 and 10 samples. Average values for $K_{IC}$ were reported in units of megapascals times the square root of meters, i.e. MPa($m^{1/2}$). Only those samples meeting the validity requirements of ASTM D 5045-99 were used in the calculations.

Thermogravimetric Analysis Procedure. Thermogravimetric analysis was run using a TA Instruments Model Q500 TGA and its associated software (available from TA Instruments, New Castle, Del.) employing a temperature ramp rate of 20 degrees Celsius (° C.)/minute from 35-900° C. in an air atmosphere. The residual weight was assumed to be the CaO remaining in the sample after volatilizing all organics and carbon dioxide from the calcite. The calcite concentration in the original sample was calculated by dividing the weight percent CaO residue by 0.56.

Neat Resin Tensile Procedure. The modulus, failure stress, and failure strain of cured samples were measured at room temperature in accordance with ASTM D638. An MTS/SinTech 5/GL test machine (SinTech, A Division of MTS Systems, Inc., P.O. Box 14226, Research Triangle Park, N.C. 27709-4226) was used, and an extensometer with a gage length of 2.5 cm (one in.). Specimen test sections were nominally 10 cm (4 in.) long×1.25 cm (0.50 in.) wide×0.32 cm (0.125 in.) thick. The loading rate was 0.51 cm/min (0.2 in/min). The modulus was taken to be the stress-strain curve fit in the linear region between 6.9 MPa (1000 psi) and 13.8 MPa (2000 psi). Three to five specimens were tested.

Polyetheramine Sulfonate Ligand. Ligand A was prepared as follows. To 100 g (0.167 mol) of polyetheramine (JEFFAMINE M-600 obtained from Huntsman, Mn=600) was added 17.88 g (0.146 mol) of melted propane sultone (purchased from TCI America). The mixture was heated to 80° C. and stirred for 16 hours. 1H NMR spectra shows complete consumption of the propane sultone. The sulfonic acid ligand was isolated as a red brown liquid and used without further purification.

Polyethylene Glycol Phosphonic Acid Ligand. Ligand B was prepared as follows. To 355.8 g (1.017 mol) of poly (ethylene glycol)methyl ether (purchased from Alfa Aesar, Mn=350) at 50° C. was dropwise added 152.8 g (1.284 mol) of thionyl chloride with stirring. Evolved gases were vented through a trap containing 25% aqueous sodium hydroxide. After the addition was complete, the temperature of the reaction mixture was raised to 70° C. After 4 hours, nitrogen was slowly bubbled through the mixture as the temperature was raised to 90° C., and the reaction mixture was held at 90° C. overnight with continued nitrogen bubbling. Remaining volatiles were separated by heating for 2 hours at 120° C. under reduced pressure, leaving 338.7 g of a clear, light amber liquid. The 1H and 13C NMR spectra of the material were consistent with the structure of the desired product, and the crude chloride was used without further purification.

A mixture of 150.0 g (0.430 mol) of the crude chloride prepared above and 214.0 g (1.290 mol) of triethyl phosphite was heated at 170° C. After 3 days, an additional 100.0 g (0.600 mol) of triethyl phosphite was added, and the reaction temperature was increased to 180° C. After an additional 2 days at 180° C., a third portion of 100.0 g (0.600 mol) of triethyl phosphite was added, and heating at 180° C. was continued. After an additional 2 days, 13C NMR analysis of the reaction mixture indicated the absence of the starting chloride at 43 ppm. Diethyl ethylphosphonate and other volatiles were distilled to a final bath temperature of 130° C., by 35-60° C. at 0.05 mm Hg, leaving 187.5 g of a clear, light yellow liquid. The 1H and 13C NMR spectra of the material were consistent with the structure of the desired product, and the crude diethyl phosphonate ester was used without further purification.

To a solution of 90.0 g (0.257 mol) of the crude diethyl phosphonate ester prepared above in 200 mL of dichloromethane was added 98.0 g (0.643 mol) of bromotrimethylsilane. After 18 hours at room temperature, the solution was concentrated under reduced pressure, and the intermediate silylphosphonate ester was dissolved in 250 mL of methanol. The resultant solution was stirred at room temperature for 2 hours. The solution was concentrated under reduced pressure, the concentrate was again dissolved in 250 mL of methanol, and the resultant solution was stirred overnight at room temperature. The mixture was concentrated as before, and after maintaining the concentrate under vacuum overnight to ensure complete separation of solvent, 80.0 g of a clear, light yellow liquid was obtained. The 1H and 13C NMR spectra of the final product were consistent with the structure of the desired phosphonic acid ligand. The 13C NMR spectrum of the product phosphonic acid showed the carbon a to phosphorus as a doublet (JC-P=138.8 Hz) at 27.17 ppm.

Acrylic Phosphonate Ligand. Ligand C was prepared as follows. To a slurry of 60.8 g (240 mmol) of 11-bromo-1-undecanol in 80.0 g (950 mmol) of dihydropyran was added 10 drops of $POCl_3$. A moderate exotherm was noted, and the remaining solids dissolved to yield a clear, amber solution. The solution was stirred for 2 hours and poured into 500 ml of saturated aqueous $NaHCO_3$. This mixture was extracted with diethyl ether, and the combined organic phases were washed with saturated aqueous NaCl and dried over $MgSO_4$.

Filtration and concentration provided the desired tetrahydropyranyl ether as a clear, amber liquid, which was used without further purification.

A mixture of the tetrahydropyranyl ether and 99.7 g (600 mmol) of triethylphosphite was heated at 135° C. for 16 hours. An additional 50.0 g (300 mmol) of triethylphosphite was added, and heating at 135° C. was continued for an additional 17 hours. Volatiles were distilled from the mixture at 0.1 mm to a bath temperature of 110° C., affording the desired diethylphosphonate ester, which was used without further purification.

To a solution of the diethylphosphonate ester in 200 mL of dichloromethane was added 91.9 g (600 mmol) of bromotrimethylsilane, dropwise over approximately 30 minutes. The mixture was stirred overnight at room temperature and concentrated to a dark liquid. The concentrate was dissolved in 300 mL of methanol, and this solution was stirred overnight at room temperature. Concentration afforded a dark semisolid, which was in turn dissolved in 300 mL of methanol, and this solution was again stirred overnight at room temperature. The solution was concentrated to a dark semisolid, 300 mL of dichloromethane was added, and this mixture was stirred overnight at room temperature. Filtration provided a light tan solid. Recrystallization from an 80:20 mixture of heptane and 2-propanol afforded 32.2 g of 1-phosphono-11-undecanol as light tan crystals, with a melting point of 109-112° C.

A solution of 25.2 g (100 mmol) of 1-phosphono-11-undecanol, 8.6 g (120 mmol) of acrylic acid and 40 mg of 2,6-di-tert-butyl-4-methylphenol in 400 mL of toluene was heated at reflux overnight with provision for azeotropic distillation of water. An additional 5.8 g (80 mmol) of acrylic acid was added, and heating at reflux was continued for an additional 10 hours. The solution was cooled to room temperature, filtered through Celite and concentrated to a soft, tan solid. The solid was triturated in 1 L of hexanes, and filtration provided 27.1 g of 11-phosphonoundececyl acrylate as an off-white solid. The 1H, 13C, and 31P NMR spectra of the final product and all intermediates were consistent with the structures of the target compounds.

Examples 1 and 2

These examples illustrate the surface modification and compounding of calcite nanoparticles with a resin system containing a reactive diluent using solventless milling in a continuous wet milling apparatus. The compositions, milling conditions, and mean and peak particle sizes are summarized in Table 2.

Nanocomposite Preparation Procedure. VE-1398-5 vinyl ester was placed in a four liter stainless steel kettle. To the kettle containing the vinyl ester was added styrene, a reactive diluent. To the vinyl ester and styrene was added a ligand, which was preheated to 90° C. to lower the viscosity for ease of handling. A Cowles mixer was attached to the kettle and the contents mixed. While mixing, SOCAL 31 nanocalcite was gradually added to the kettle. Once fully mixed, the contents were transferred to another four liter kettle attached to a horizontal mill (Netzsch LABSTAR) with 0.5 mm YTZ media used at a 90% loading. The nanocomposite mixture was circulated through the mill using a peristaltic pump at 250 ml/min.

TABLE 2

Calcite modified with Ligand A and compounded.

| Ex. | SOCAL 31 (g) | VE-1398-5 (g) | Styrene (g) | JAS (g) | Mill Temp. (° C.) | Mill time (hrs) | Mean (microns) | Peak (microns) |
|---|---|---|---|---|---|---|---|---|
| 1 | 414 | 506 | 92 | 39 | 54 | 4 | 0.288 | 0.296 |
| 2 | 5318 | 6500 | 1721 | 532 | 50 | 5 | 0.278 | 0.259 |

Examples 3 and 4

These examples illustrate the surface modification and compounding of calcite nanoparticles with a resin system containing a reactive diluent using solventless milling in a wet milling apparatus (i.e., the horizontal mill of Examples 1 and 2). The samples were prepared according to the Nanocomposite Preparation Procedure. The compositions, milling conditions, and mean and peak particle sizes are summarized in Table 3.

TABLE 3

Calcite modified with Ligands B and C and compounded.

| Ex. | SOCAL 31 (g) | VE-1398-5 (g) | Styrene (g) | Ligand | | Mill Temp. (° C.) | Mill time (hrs) | Mean (μm) | Peak (μm) |
|---|---|---|---|---|---|---|---|---|---|
| 3 | 300 | 367 | 67 | B | 25 | 50 | 1.2 | 0.274 | 0.259 |
| 4 | 300 | 367 | 134 | C | 25 | 50 | 0.5 | 0.258 | 0.259 |

Example 5

This Example illustrates solventless milling with a reactive diluent and a commercially available dispersant to disperse calcite in a vinyl ester resin using a continuous wet milling apparatus. A composition containing 857 g of VE-1398-5 vinyl ester, 234 g of styrene, 35 g of DISPERBYK-111, and 700 g of SOCAL 31 nanocalcite were compounded according to the Nanocomposite Preparation Procedure except that the DISPERBYK-111 dispersant was used instead of a ligand. The composition was milled at 57° C. for three hours in a continuous wet milling apparatus (i.e., the horizontal mill of Examples 1 and 2). The resulting surface-modified nanoparticles were dispersed in the resin system and had a mean particle size of 0.257 microns, and a peak particle size of 0.259 microns.

Example 6

This Example shows solventless milling of a mixture of agglomerated particles, a crosslinkable dispersant, resin, and reactive diluent in a wet milling apparatus (i.e., the horizontal mill of Examples 1 and 2). VE 1398-5, a curable vinyl ester resin (600 g), was placed in a stainless steel container. X300 dispersant (30 g, i.e., 7.5 wt. % based on the weight of calcite), preheated to 90° C. for ease of handling, was added to the container. Styrene (50 g) was then added to the container as the reactive diluent. A Cowles mixer (DISPER- MAT CN-10, BYK-Gardner, Columbia, Md., USA) was lowered into the container and mixing initiated. SOCAL 31 nanocalcite (400 g) was then added to the container gradually and mixing continued until a uniform mixture was produced.

The mixture was transferred to a jacketed kettle connected to a peristaltic pump (MASTERFLEX L/S, Cole-Parmer Instrument Company, Vernon Hills, Ill., USA) to circulate material between the kettle and the mill. The flow rate was 250 ml/min. The composition was milled at 35° C. for three hours. The resulting surface-modified nanoparticles were dispersed in the resin system and had a mean particle size of 0.253 microns, and a peak particle size of 0.259 microns.

Cured Resin Properties.

The milled product of Example 1 (270 g) was mixed with PERKADOX 16 (1.62 g) and TRIGONOX 121 (1.62 g) in a SpeedMixer container. The container was sealed and the contents mixed at 2000 revolutions/minute (rpm) for 30 seconds using a SpeedMixer™ dual asymmetric centrifuge (Model DAC 600 FVZ-sp, available from Flack Tek, Incorporated, Landrum, S.C.). The contents were then poured into 2 glass molds: (a) 8.9 cm×17.8 cm×0.64 cm (3.5 in×7 in×0.25 in) and (b) 22.9 cm×11.4 cm×0.32 cm (9 in×4.5 in×0.125 in). The molds were allowed to sit at room temperature for 15 minutes. Then the molds were moved to a 121° C. (250° F.) oven for 45 minutes. The milled products of Examples 3-6 were also cured following a similar procedure. The specimens were then used for testing in $K_{IC}$ and neat resin tensile. The results are summarized in Table 4.

Comparative Example CE-1

For comparison, 270 g of VE-1398-5 vinyl ester resin was mixed with was mixed with PERKADOX 16 (2.70 g) and TRIGONOX 121 (2.70 g) in a SpeedMixer container. The container was sealed and the contents mixed at 2000 revolutions/minute (rpm) for 30 seconds using a SpeedMixer™ dual asymmetric centrifuge (Model DAC 600 FVZ-sp, available from Flack Tek, Incorporated, Landrum, S.C.). The contents were then poured into 2 glass molds: (a) 8.9 cm×17.8 cm×0.64 cm (3.5 in×7 in×0.25 in) and (b) 22.9 cm×11.4 cm×0.32 cm (9 in×4.5 in×0.125 in). The molds were allowed to sit at room temperature for 15 minutes. Then the molds were moved to a 121° C. (250° F.) oven for 45 minutes. The specimens were then used for testing in $K_{IC}$ and neat resin tensile. The results are summarized in Table 4.

TABLE 4

Mechanical properties of cured resin systems.

| Sample | Calcite (wt. %) | Ligand/ Dispersant | $K_{IC}$ (MPa(m$^{1/2}$)) | Modulus (ksi) | Elongation at Break (%) | Stress at yield (MPa) |
|---|---|---|---|---|---|---|
| Cured CE-1 | none | none | 0.70 | 475 | 4.13 | 81 |
| Cured EX-1 | 43% | Ligand A | 1.03 | 757 | 1.97 | 53 |
| Cured EX-3 | 43% | Ligand B | 1.95 | — | — | — |
| Cured EX-4 | 44% | Ligand C | 0.57 | — | — | — |
| Cured EX-5 | 44% | Disp-A | 0.79 | — | — | — |
| Cured EX-6 | 39% | Disp-B | 1.12 | — | — | — |

Examples 7-14

These Examples show solventless milling of a mixture of agglomerated particles, ligand, epoxy resin, and reactive diluent in a wet milling apparatus, i.e., the horizontal mill of Examples 1 and 2. The solventless milling includes in situ nanoparticle-ligand functionalization and ligand-resin reactive compatibilization.

A curable epoxy resin was preheated to 90° C. for ease of handling and placed in a stainless steel container. Ligand A, preheated to 90° C. for ease of handling, was added to the container. A reactive diluent was then added to the container. A Cowles mixer (DISPERMAT CN-10, BYK-Gardner, Columbia, Md., USA) was lowered into the container and mixing initiated. SOCAL 31 nanocalcite was then added to the container gradually and mixing continued until a uniform mixture was produced. The mixture was transferred to a jacketed kettle connected to a peristaltic pump (Masterflex L/S, Cole-Parmer Instrument Company, Vernon Hills, Ill., USA to circulate material between the kettle and the horizontal mill. The flow rate was 250 ml/min. The specific epoxy resin, reactive diluent, and amounts are summarized in Table 6. All samples were prepared with Ligand A at 7.5 wt. % based on the weight of the calcite, and milled for one hour at the temperatures indicated in Table 6.

The particle analysis results in the table below show a single low particle size distribution indicating effective solventless milling of a nanocomposite with a reactive diluent and in situ nanoparticle-ligand functionalization and ligand-resin reactive compatibilization.

TABLE 6

Calcite modified with Ligand A and compounded into epoxy resins with reactive diluents.

| Ex. | SOCAL 31 (g) | Epoxy (g) | reactive diluent (g) | Lig. A (g) | temp (° C.) | mean (microns) | peak (microns) |
|---|---|---|---|---|---|---|---|
| 7 | 1000 | EPON 828 | 600 AGE | 134 | 75 | 64 | 0.265 | 0.296 |
| 8 | 1000 | EPON 828 | 600 ECHM-ECHC | 134 | 75 | 76 | 0.260 | 0.259 |
| 9 | 1000 | EPON 828 | 600 PEG-DGE | 134 | 75 | 94 | 0.266 | 0.259 |
| 10 | 1000 | EPON 828 | 600 EHGE | 134 | 75 | 89 | 0.259 | 0.259 |
| 11 | 1000 | EPON 828 | 600 BDGE | 134 | 75 | 93 | 0.255 | 0.259 |
| 12 | 700 | EPON 828 | 685 CHDDGE | 171 | 53 | 92 | 0.249 | 0.259 |
| 13 | 700 | EPON 862 | 685 CHDDGE | 171 | 53 | 84 | 0.247 | 0.259 |

TABLE 6-continued

Calcite modified with Ligand A and compounded into epoxy resins with reactive diluents.

| Ex. | SOCAL 31 (g) | Epoxy (g) | | reactive diluent (g) | | Lig. A (g) | temp (° C.) | mean (microns) | peak (microns) |
|---|---|---|---|---|---|---|---|---|---|
| 14 | 700 | EPON 825 | 685 | CHDDGE | 171 | 53 | 84 | 0.247 | 0.259 |

Example 15

This Example shows solventless milling of a mixture of agglomerated particles, ligand, epoxy resin, and reactive diluent in a batch wet milling apparatus. The solventless milling includes in situ nanoparticle-ligand functionalization and ligand-resin reactive compatibilization.

A curable vinyl ester resin (2371 g of VE 1398-5), was placed in a stainless steel container. Ligand A (172 g) was preheated to 90° C. for ease of handling, and added to the container. A reactive diluent (409 g of styrene) was then added to the container. A Cowles mixer (DISPERMAT CN-10, BYK-Gardner, Columbia, Md., USA) was lowered into the container and mixing was initiated. Nanocalcite (1717 g of SOCAL 31) was then added to the container gradually and mixing continued until a uniform mixture was produced. The mixture was transferred to a jacketed kettle.

A basket mill (also known as an immersion mill) was lowered into the kettle. The basket mill was a HCP-1/4 Immersion Mill (Hockmeyer, Harrison, N.J.) containing 150 milliliters of 0.5 mm yttrium-stabilized zirconia beads. The mill speed was set to its maximum setting of "10," and a 0.2 mm separation screen was used.

The resulting surface-modified nanoparticles were dispersed in the resin system and had a mean particle size of 0.284 microns, and a peak particle size of 0.296 microns. The particle analysis showed a narrow particle size distribution with nearly 100% (98%) of the particles within this peak.

Various modifications and alterations of this invention will become apparent to those skilled in the art without departing from the scope and spirit of this invention.

What is claimed is:

1. A method of preparing a composition comprising combining nanoparticles, a surface modifying agent, and a curable resin to form a mixture, and milling the mixture in a wet milling apparatus comprising milling beads to form a milled resin system; wherein the mixture comprises less than 2 wt. % solvent as it is being milled in the wet milling apparatus, and further wherein the nanoparticles comprise calcite nanoparticles, and further wherein the surface modifying agent is selected from the group consisting of sulfonic acid ligand and a phosphonic acid ligand, and further wherein the surface modifying agent comprises a binding group and a compatiblizing segment, and further wherein the difference in the solubility parameter of the compatiblizing segment and the curable resin is no more than 4 $J^{1/2}$ $cm^{-3/2}$, whereby comminution, surface functionalization, and compounding of the nanoparticles into the milled resin system each occur in the milling of the mixture.

2. The method of claim 1, wherein the wet milling apparatus is a continuous wet milling apparatus.

3. The method according to claim 1, wherein the milled mixture comprises surface-modified nanoparticles dispersed in the curable resin, wherein the surface-modified nanoparticles comprise the nanoparticles modified with the surface modifying agent.

4. The method according to claim 1, wherein the curable resin comprises a vinyl ester.

5. The method according to claim 1, wherein the mixture further comprises a reactive diluent and the reactive diluent comprises styrene.

6. The method according to any claim 1, wherein the curable resin comprises an epoxy.

7. The method according to claim 6, wherein the milled mixture further comprises a reactive diluent, and the reactive diluent is selected from the group consisting of mono- and multi-functional glycidyl ethers.

8. The method of claim 1, wherein the surface modifying agent comprises a zwitterion.

9. The method of claim 1, wherein the surface modifying agent comprises polyetheramine sulfonic acid.

10. The method of claim 1, wherein the surface modifying agent comprises at least one of polyethylene glycol phosphonic acid and acryl phosphonic acid.

11. The method of claim 1, wherein the mixture comprises less than 0.5 wt. % solvent.

12. A milled resin system made according to the method of claim 1.

13. A fibrous composite comprising the milled resin system of claim 12 and reinforcing fibers.

14. The method of claim 1 wherein the binding group comprises a phosphonic acid, a sulfonic acid, a phosphoric acid, or a combination thereof.

15. The method of claim 1 wherein the nanoparticles can have a particle size of ranging from about 5 nm to about 150 nm.

16. The method of claim 1 wherein the nanoparticles have a primary particle size of between about 5 nm and about 500 nm.

17. The method of claim 1 wherein the nanoparticles have a primary particle size of between about 5 nm and about 250 nm.

18. The method of claim 1 wherein the mixture comprises essentially no added solvent as it is being milled in the wet milling apparatus.

* * * * *

UNITED STATES PATENT AND TRADEMARK OFFICE
CERTIFICATE OF CORRECTION

PATENT NO. : 9,783,681 B2
APPLICATION NO. : 13/500836
DATED : October 10, 2017
INVENTOR(S) : Peter Condo et al.

It is certified that error appears in the above-identified patent and that said Letters Patent is hereby corrected as shown below:

In the Specification

Column 5, in the Formula

Lines 1-5, delete "Com. Seg.—P(=O)(=O)—OH" and insert -- Com. Seg.—S(=O)(=O)—OH --, therefor.

Column 10
Line 35, delete "by" and insert -- bp --, therefor.
Line 57, delete "carbon a" and insert -- carbon α --, therefor.
Line 64, delete "ml," and insert -- mL --, therefor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*